United States Patent
Wei et al.

(10) Patent No.: US 10,237,526 B2
(45) Date of Patent: Mar. 19, 2019

(54) SHOOTING METHOD AND SHOOTING DEVICE

(71) Applicant: NUBIA TECHNOLOGY CO., LTD, Shenzhen, Guangdong (CN)

(72) Inventors: Yuhong Wei, Shenzhen (CN); Qiang Li, Shenzhen (CN); Shan Cong, Shenzhen (CN)

(73) Assignee: Nubia Technology Co., LTD (CN)

( * ) Notice: Subject to any disclaimer, the term of this patent is extended or adjusted under 35 U.S.C. 154(b) by 290 days.

(21) Appl. No.: 15/120,730

(22) PCT Filed: Dec. 16, 2014

(86) PCT No.: PCT/CN2014/093967
§ 371 (c)(1),
(2) Date: Aug. 22, 2016

(87) PCT Pub. No.: WO2015/124022
PCT Pub. Date: Aug. 27, 2015

(65) Prior Publication Data
US 2018/0213199 A1    Jul. 26, 2018

(30) Foreign Application Priority Data
Feb. 22, 2014    (CN) .......................... 2014 1 0063215

(51) Int. Cl.
*H04N 9/73*       (2006.01)
*H04N 1/60*       (2006.01)
(52) U.S. Cl.
CPC ........... *H04N 9/735* (2013.01); *H04N 1/6027* (2013.01); *H04N 1/6077* (2013.01); *H04N 1/6086* (2013.01)

(58) Field of Classification Search
CPC ...... H04N 9/73; H04N 9/3182; H04N 1/6041; H04N 1/6027; H04N 1/6077; H04N 1/6086; H04N 5/2356
See application file for complete search history.

(56) References Cited

U.S. PATENT DOCUMENTS 8,941,756 B2    1/2015  Shimizu
2012/0057045 A1  3/2012  Shimizu
(Continued)

FOREIGN PATENT DOCUMENTS

CN    102104709 A    6/2011
CN    102387373 A    3/2012
(Continued)

OTHER PUBLICATIONS

International Search Report dated Mar. 24, 2015 in International Application No. PCT/CN2014/093967, 2 pages.
(Continued)

*Primary Examiner* — Nelson D. Hernández Hernández
(74) *Attorney, Agent, or Firm* — Eric L. Sophir; Dentons US LLP

(57) ABSTRACT

A shooting method comprising the steps of: defining at least two sub-regions on a shot picture; using the at least two sub-regions as color temperature reference regions to conduct white balance adjustment and shoot photographs; determining a color temperature reference region selected on a shot photograph; and calling out a photograph obtained by shooting after white balance adjustment according to the selected color temperature reference region from the shot photographs and displaying same, so that it is realized that photographs are shot first and then white balance adjustment is conducted thereon. Although photographs are shot first and then white balance adjustment is conducted thereon, in fact, many photographs have been obtained after independent white balance adjustment is conducted when the pho- (Continued)

tographs are shot. Therefore, embodiments may accurately restore a previous white balance effect in a shooting environment after the color temperature reference regions are selected afterwards.

9 Claims, 2 Drawing Sheets

(56) References Cited

U.S. PATENT DOCUMENTS

2013/0113957 A1* 5/2013 Hamada ............... H04N 5/2351
                                                                 348/223.1
2015/0130981 A1* 5/2015 Hagiwara .......... H04N 5/23293
                                                                 348/333.02

FOREIGN PATENT DOCUMENTS

| CN | 103037224 A  | 4/2013 |
|----|--------------|--------|
| CN | 103096096 A  | 5/2013 |
| CN | 103200410 A  | 7/2013 |
| CN | 103841390 A  | 6/2014 |
| WO | 2013054726 A1 | 4/2013 |

OTHER PUBLICATIONS

English Translation of the Written Opinion of the International Search Authority in international application No. PCT/CN2014/093967, dated Mar. 24, 2015, 10 pages.

International Search Report dated Mar. 24, 2015 in International Application No. PCT/CN2014/093967, 5 pages.

* cited by examiner

SHOOTING METHOD AND SHOOTING DEVICE

CROSS-REFERENCE TO RELATED APPLICATIONS

This application claims priority to PCT/CN2014/093967, filed Dec. 16, 2014, which claims priority to Chinese Patent Application No. 201410063215.8, filed Feb. 22, 2014, all of which are incorporated by reference in their entirety.

FIELD OF TECHNOLOGY

The disclosure relates to the technical field of photography, and in particular to a shooting method and shooting device capable of shooting photos and then adjusting white balance.

BACKGROUND

When a photo is shot, a user may adjust white balance of a screen according to difference shooting scenes to achieve a better shooting effect or recover a real colour of an object. The user may select a certain colour temperature value, and then a shooting device adjusts the white balance of the screen according to the colour temperature value to further obtain a photo with a better colour effect or white balance effect.

However, when an existing shooting device adjusts white balance, the white balance is required to be adjusted before a shutter is pressed, that is, a photo is shot after the white balance is adjusted. For some special shooting scenes where pictures are required to be captured fast or there is no sufficient time for a user to adjust white balance, such as a scene of shooting an object which moves fast, it is difficult to adjust white balance in advance to achieve a better colour effect, which may cause a poor shooting effect. Moreover, the existing shooting device may record a picture with a single white balance effect by a single shooting, and may not meet diversified requirements of the user.

SUMMARY

A main purpose of the disclosure is to provide a shooting method and a shooting device, so as to achieve shooting first and then adjusting white balance, meet a shooting requirement of a user in a special application scene and obtain photos with difference white balance effects or colour effects.

In order to achieve the purpose, the disclosure discloses a shooting method, which may include:
  defining at least two sub-regions on a screen;
  shooting photos after performing white balance adjustment by taking the at least two sub-regions as colour temperature reference regions;
  determining a selected colour temperature reference region on one of the shot photos; and
  picking a photo shot after performing the white balance adjustment according to the selected colour temperature reference region out of the shot photos, and displaying the photo.

Preferably, the step of determining the selected colour temperature reference region on one of the shot photos may include:
  displaying a selection pattern on one of the shot photos; and
  moving the selection pattern according to operation, and determining the sub-region corresponding to a position of the selection pattern as the selected colour temperature reference region.

Preferably, the step of determining the selected colour temperature reference region on one of the shot photos may include:
  determining a position where one of the shot photos is touched or clicked; and
  determining the sub-region corresponding to the position as the colour temperature reference region.

Preferably, the step of shooting the photos after performing the white balance adjustment by taking the at least two sub-regions as the colour temperature reference regions may include:
  obtaining at least two colour temperature values by taking each of the at least two sub-regions as the colour temperature reference region; and
  shooting at least two photos after performing the white balance adjustment on the screen according to the at least two colour temperature values respectively.

Preferably, the step of shooting the photos after performing the white balance adjustment by taking the at least two sub-regions as the colour temperature reference regions may include:
  obtaining colour temperature values of the at least two sub-regions by taking each of the at least two sub-regions as a colour temperature reference region, and obtaining a colour temperature value of the whole screen by taking the whole screen as a colour temperature reference region;
  calculating a weighted average of the colour temperature value of each sub-region and the colour temperature value of the whole screen to finally obtain at least two weighted averages; and
  shooting at least two photos after performing the white balance adjustment on the screen according to the at least two weighted averages respectively.

The disclosure further discloses a shooting method, which may include:
  displaying a selection pattern on a photo;
  determining a colour temperature reference region according to a position of the selection pattern; and
  picking a photo shot after performing white balance adjustment according to the colour temperature reference region out of the shot photos, and displaying the photo.

Preferably, the method may further include: before the step of displaying the selection pattern on the photo,
  defining at least two sub-regions on a screen; and
  shooting at least two photos after performing the white balance adjustment by taking each of the at least two sub-regions as a colour temperature reference region.

Preferably, the step of shooting the at least two photos after performing the white balance adjustment by taking each of the at least two sub-regions as the colour temperature reference region may include:
  obtaining at least two colour temperature values by taking each of the at least two sub-regions as the colour temperature reference region; and
  shooting the at least two photos after performing the white balance adjustment on the screen according to the at least two colour temperature values respectively.

Preferably, the step of shooting the at least two photos after performing the white balance adjustment by taking each of the at least two sub-regions as the colour temperature reference region may include:
  obtaining colour temperature values of the at least two sub-regions by taking each of the at least two sub-regions as a colour temperature reference region, and obtaining a colour temperature value of the whole screen by taking the whole screen as a colour temperature reference region;

calculating a weighted average of the colour temperature value of each sub-region and the colour temperature value of the whole screen to finally obtain at least two weighted averages; and shooting the at least two photos after performing the white balance adjustment on the screen according to the at least two weighted averages respectively.

Preferably, the step of determining the colour temperature reference region according to the position of the selection pattern comprises:

determining a sub-region corresponding to the position of the selection pattern; and taking the sub-region as the colour temperature reference region.

The disclosure further provides a shooting device, which may include a shooting unit, a display module and a processing unit, wherein the shooting module may be configured to shoot photos for a screen;

the display module may be configured to display the screen and photos, and display a selection pattern on the photos; and the processing module may be configured to move position of the selection pattern, determine a colour temperature reference region according to the position of the selection pattern, pick a photo shot after performing white balance adjustment according to the colour temperature reference region out of the shot photos and control the display module to display the photo.

Preferably, the shooting module may be configured to: define at least two sub-regions on the screen, and shoot at least two photos after performing the white balance adjustment by taking each of the at least two sub-regions as the colour temperature reference region.

Preferably, the shooting module may be configured to: calculate a colour temperature value of each sub-region to finally obtain at least two colour temperature values; and perform white balance adjustment on the screen according to the at least two colour temperature values respectively.

Preferably, the shooting module may be configured to: calculate the colour temperature value of each sub-region to finally obtain the colour temperature values of the at least two sub-regions; simultaneously obtain a colour temperature value of the whole screen by taking the whole screen as a colour temperature reference region; calculate a weighted average of the colour temperature value of each sub-region and the colour temperature value of the whole screen to finally obtain at least two weighted averages; and perform the white balance adjustment on the screen according to the at least two weighted averages respectively.

Preferably, the processing module may be configured to: determine a sub-region corresponding to the position of the selection pattern and take the sub-region as the colour temperature reference region.

The disclosure further provides a shooting method, which may include steps of:

receiving an operating instruction for a photo;

determining a colour temperature reference region according to the operating instruction; and picking a photo shot after performing white balance adjustment according to the colour temperature reference region out of the shot photos, and displaying the photo.

Preferably, the method may further include: before the step of receiving the operating instruction for the photo defining at least two sub-regions on a screen; and shooting at least two photos after performing white balance adjustment by taking each of the at least two sub-regions as the colour temperature reference region.

Preferably, the step of shooting the at least two photos after performing the white balance adjustment by taking each of the at least two sub-regions as a colour temperature reference region may include:

obtaining at least two colour temperature values by taking each of the at least two sub-regions as the colour temperature reference region; and shooting the at least two photos after performing the white balance adjustment on the screen according to the at least two colour temperature values respectively.

Preferably, the step of shooting the at least two photos after performing the white balance adjustment by taking each of the at least two sub-regions as the colour temperature reference region may include:

obtaining colour temperature values of the at least two sub-regions by taking each of the at least two sub-regions as a colour temperature reference region, and obtaining a colour temperature value of the whole screen by taking the whole screen as a colour temperature reference region;

calculating a weighted average of the colour temperature value of each sub-region and the colour temperature value of the whole screen to finally obtain at least two weighted averages; and shooting the at least two photos after performing the white balance adjustment on the screen according to the at least two weighted averages respectively.

Preferably, the operating instruction may include touch or clicking operation performed on the photo, and the step of determining the colour temperature reference region according to the operating instruction may include:

determining a sub-region corresponding to a position where the photo is touched or clicked; and taking the sub-region as the colour temperature reference region.

According to the shooting method capable of taking the photos and then adjusting the white balance in the disclosure, when the photos are shot, a plurality of photos with various colour effects or white balance effects are automatically shot after white balance adjustment is independently performed by taking multiple regions of the screen as the colour temperature reference regions respectively, and after the photos are shot, the user selects the colour temperature reference regions, and based on the colour temperature reference regions selected by the user, the photos shot after white balance adjustment is performed according to the colour temperature reference region is picked out for the user to preview and select, so that the user may obtain multiple photos meeting his/her own requirement and with better colour effects by a single shooting.

Although the white balance is adjusted after the photos are shot in the disclosure, multiple photos of which white balance is independently adjusted have actually been obtained when the photos are shot, so that an original white balance effect of a shooting environment may be accurately recovered after a colour temperature reference region is selected, and the advantages of both white balance pre-adjustment and post-adjustment are achieved. Therefore, shooting requirements of the user in different application scenes are met, the effect of independent white balance post-adjustment may also be achieved, multiple photos with independent white balance effects may be obtained by a single shooting, and a user experience is greatly improved.

Achievement of the purpose, function characteristics and advantages of the disclosure will be further described in conjunction with embodiments with reference to the drawings.

DETAILED DESCRIPTION

It should be understood that specific embodiments described herein are only adopted to explain the disclosure and not intended to limit the disclosure.

According to a shooting method (image processing method) of the disclosure, a user is not required to perform white balance adjustment before shooting a photo, i.e. pressing a shutter, and instead, the user selects a colour temperature reference region on the photo for white balance adjustment after shooting the photo to achieve a photo effect required by the user.

Figure 1:
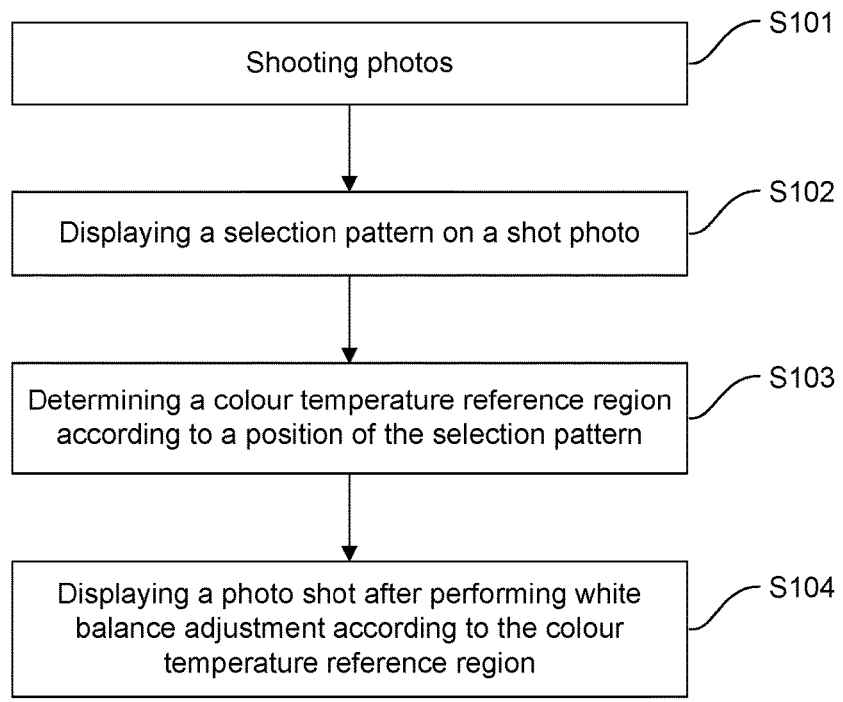
FIG. 1 is a flowchart illustrating an embodiment of a shooting method according to the disclosure.

Referring to FIG. 1, an embodiment of a shooting method which includes the following steps of the disclosure is disclosed.

Step 101: photos are shot.

Before shooting, at least two sub-regions are defined on a screen, then white balance adjustment is performed by taking each of the at least two sub-regions as a colour temperature reference region, and a plurality of photos are shot. The sub-regions may be spaced, and may also be continuously distributed, i.e. the screen is continuously divided into multiple sub-regions.

Figure 2:
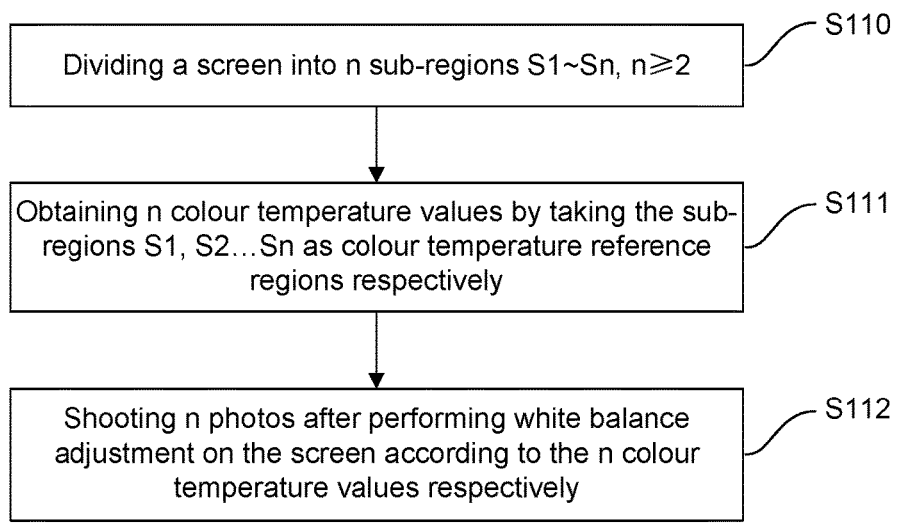
FIG. 2 is a flowchart of an example of a shooting process of Step 101 in FIG. 1.

A specific shooting process may, as shown in FIG. 2, includes the following steps.

Step 110: the screen is divided into n sub-regions S1~Sn, n≥2.

During framing, the screen in a framing window is divided into at least two sub-regions, and a shape and size of each sub-region are not limited. Preferably, the screen is evenly divided into n rectangular sub-regions, n≥2.

Step 111: n colour temperature values are obtained by taking the sub-regions S1, S2 . . . Sn as colour temperature reference regions respectively.

When the sub-region S1 is taken as a colour temperature reference region, an average colour temperature value in a range of the sub-region S1 is calculated, and the colour temperature value is taken as a reference for adjusting white balance of the whole screen. Similarly, totally n colour temperature values are obtained by taking the sub-regions S2, S2 . . . Sn as colour temperature reference regions respectively.

Step 112: n photos are shot after white balance adjustment is performed on the screen according to the n colour temperature values respectively.

Different colour temperature values correspond to different white balance effects, so that the n colour temperature values correspond to the n photos with different white balance effects or colour effects. In the disclosure, a plurality of photos with different shooting effects are obtained at the same time by a single shooting, and each photo is shot by independent white balance adjustment.

Figure 3:
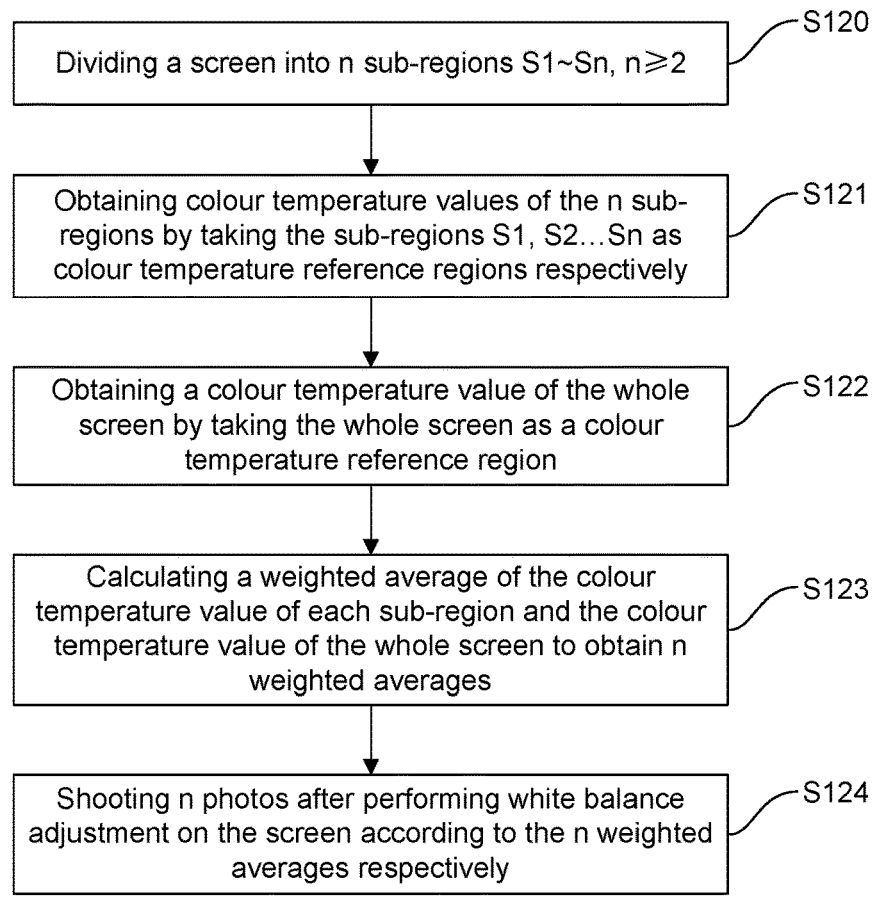
FIG. 3 is a flowchart of another example of a shooting process of Step 101 in FIG. 1.

The shooting process may also, as shown in FIG. 3, includes the following steps.

Step 120: the screen is divided into n sub-regions S1~Sn, n≥2.

During framing, the screen in the framing window is divided into at least two sub-regions, and a shape and size of each sub-region are not limited. Preferably, the screen is evenly divided into n rectangular sub-regions.

Step 121: colour temperature values of then sub-regions are obtained by taking the sub-regions S1, S2 . . . Sn as the colour temperature reference regions respectively.

When sub-region S1 is taken as a colour temperature reference region, an average colour temperature value in a range of the sub-region S1 is calculated, and the colour temperature value is taken as a reference for adjusting white balance of the whole screen. Similarly, totally n colour temperature values are finally obtained by taking the sub-regions S2, S3 . . . Sn as colour temperature reference regions respectively.

Step 122: a colour temperature value of the whole screen is obtained by taking the whole screen as a colour temperature reference region.

When the whole screen is taken as a colour temperature reference region, an average colour temperature value of the whole screen is calculated. Step 122 and Step 121 may be executed at the same time or one by one.

Step 123: a weighted average of the colour temperature value of each sub-region and the colour temperature value of the whole screen is calculated to obtain n weighted averages.

If the colour temperature value of sub-region S1 is A1 and the colour temperature value of the whole screen is B, the weighted average is $C1=XA1+YB$, where X and Y are weighting coefficients; and the weighted average C1 is taken as a reference for adjusting the white balance of the whole screen. Similarly, the weighted averages of the colour temperature values of the sub-regions S2~Sn and the colour temperature value of the whole screen are calculated respectively to finally obtain totally n weighted averages C1~Cn.

Step 124: n photos are shot after white balance adjustment is performed on the screen according to the n weighted averages respectively.

Different colour temperature values correspond to different white balance effects, so that the n weighted averages correspond to the n photos with different white balance effects or colour effects. In the disclosure, a plurality of photos with different shooting effects are obtained at the same time by a single shooting, and each photo is shot by independent white balance adjustment.

In the aforementioned shooting process, the photo may be shot after adjusting the white balance on the basis of each sub-region. That is, white balance adjustment is performed by taking sub-region S1 as a colour temperature reference region at first, and photo P1 is accordingly shot; then white balance adjustment is performed by taking sub-region S2 as a colour temperature reference region, and Photo P2 is accordingly shot; and similarly, totally n photos P1~Pn are finally obtained.

After the photos are shot, Step 102 is executed.

Step 102: a selection pattern is displayed on the shot photo.

After the photos are shot, a photo to be displayed on a screen of a shooting device for the user to preview is randomly picked out from the n shot photos, and at the same time, the selection pattern is displayed on the photo. A size and shape of the selection pattern are not limited, the photo may be rectangular, round, triangular or the like, and the size and shape of the selection pattern are preferably the same as the size and shape of each sub-region. A position, shape and size of the selection pattern may be adjusted, and the user may adjust the position of the selection pattern by dragging the selection pattern on the screen, and may also directly click the screen to implement automatic movement of the selection pattern to a position where the user clicks.

Step 103: a colour temperature reference region is determined according to a position of the selection pattern.

When the user moves the selection pattern to a certain position, the shooting device determines the sub-region corresponding to the position of the selection pattern, and takes the sub-region as a colour temperature reference region selected by the user.

In some embodiments, the selection pattern may also not be displayed on the photo, the user may directly touch or click the photo to issue an operating instruction. After receiving the operating instruction, based on a position where the user touches or clicks, the shooting device determines the sub-region corresponding to the position, and then takes the sub-region as the colour temperature reference region. Clicking includes soaring clicking.

Step 104: a photo shot after white balance adjustment is performed according to the colour temperature reference region are displayed.

After the colour temperature reference region is determined, the shooting device picks the photo shot after white balance adjustment is performed by taking the sub-region as the colour temperature reference region out of the shot photos, and displays the photo on the screen for the user to preview. For example, if the sub-region corresponding to the position of the selection pattern is S3, the shooting device picks out photo P3 shot after performing white balance adjustment by taking sub-region S3 as a colour temperature reference region, and displays the photo P3 on the screen for the user to preview. If the user is satisfied after previewing, the user may select to store the photo. After the photo is stored, the selection pattern may also be continuously moved on the screen to obtain other photos with different white balance effects or colour effects.

In some embodiments, there may be multiple selection patterns, positions, shapes and sizes of respective selection patterns correspond to the sub-regions one to one, and the selection patterns annularly surround each sub-region. When the user clicks a certain selection pattern, the sub-region corresponding to the position of the selection pattern is taken as the colour temperature reference region selected by the user, and then a photo shot after white balance adjustment is performed by taking the sub-region as the colour temperature reference region is picked out and displayed.

In some embodiments, the shooting device may also receive a photomontage shot according to the above shooting method from external equipment, then display a selection pattern on the photomontage, or receive an operating instruction for the photomontage from the user, accordingly determine a colour temperature reference region and finally picks out a photo shot after white balance adjustment is performed according to the colour temperature reference region from photomontages and display the photo.

According to the shooting method of the disclosure, when the photos are shot, a plurality of photos with various colour effects or white balance effects are automatically shot after white balance adjustment is independently performed by taking multiple regions of the screen as the colour temperature reference regions respectively, and after the photos are shot, the user selects a colour temperature reference region, and based on the colour temperature reference region selected by the user, a photo shot after white balance adjustment is performed according to the colour temperature reference region is picked out for the user to preview and select, so that the user may obtain multiple photos meeting her/his own requirement and with better colour effects by a single shooting.

The technical solution capable of shooting the photos and then adjusting the white balance in the disclosure is particularly applied to a special shooting scene where there is no sufficient time for the user to adjust the white balance or a picture is required to be captured fast, such as a condition of shooting an object which moves fast. Although the white balance is adjusted after the photos are shot in the disclosure, multiple photos of which white balance is independently adjusted have actually been obtained when the photos are shot, so that an original white balance effect of a shooting environment may be accurately recovered after the colour temperature reference regions are selected, and the advantages of both white balance pre-adjustment and post-adjustment are achieved. Therefore, shooting requirements of the user in different application scenes are met, the effect of independent white balance post-adjustment may also be achieved, multiple photos with independent white balance effects may be obtained by a single shooting, and a user experience is greatly improved.

Figure 4:
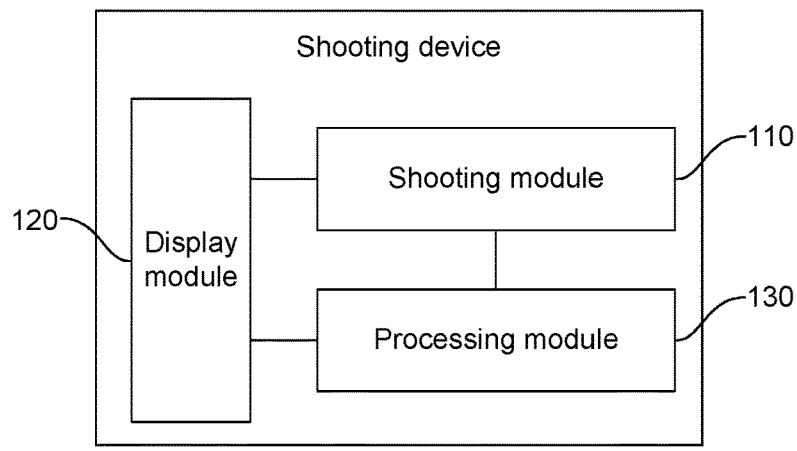
FIG. 4 is a structure block diagram of an embodiment of a shooting device according to the disclosure.

Referring to FIG. 4, an embodiment of a shooting device (image processing device) of the disclosure is provided, and the shooting device may be a camera and terminal equipment with a camera shooting function such as a mobile phone, a tablet and etc. The shooting device is a shooting device implementing the abovementioned shooting method, and includes a shooting unit, a display module and a processing unit.

The shooting module 110 is configured to frame a photographic field into a framing window and shoot photos for a screen in the framing window. When shooting the photos, the shooting module 110 divides the screen into at least two sub-regions, and shoots at least two photos after white balance adjustment is performed by taking each of the at least two sub-regions as a colour temperature reference region. Wherein, a shape and size of each sub-region are not limited, the sub-regions may be spaced, and may also be continuously distributed, i.e. the screen is continuously divided into multiple sub-regions. Preferably, the screen is evenly divided into n rectangular sub-regions S1~Sn, n≥2.

In some embodiments, the shooting module 110 calculates a colour temperature value of each sub-region to finally obtain at least two colour temperature values, and performs white balance adjustment on the screen according to the at least two colour temperature values respectively. Specifically, the shooting module 110 takes the sub-region S1 as a colour temperature reference region, calculates an average colour temperature value in a range of the sub-region S1, and takes the colour temperature value as a reference for adjusting white balance of the whole screen. Similarly, totally n colour temperature values are obtained by taking the sub-regions S2, S2 . . . Sn as colour temperature reference regions respectively. Finally, n photos with different colour effects or white balance effects are shot after white balance adjustment is performed on the screen according to the n colour temperature values respectively.

In some other embodiments, the shooting module 110 calculates the colour temperature value of each sub-region to finally obtain the colour temperature values of the at least two sub-regions, at the same time obtains a colour temperature value of the whole screen by taking the whole screen as a colour temperature reference region, calculates a weighted average of the colour temperature value of each sub-region and the colour temperature value of the whole screen to finally obtain at least two weighted averages, and performs white balance adjustment on the screen according to the at least two weighted averages respectively. Specifically, the shooting module 110 takes the whole screen as a colour temperature reference region, and calculates an average colour temperature value of the whole screen. It is assumed that the colour temperature values of the sub-region S1~Sn are A1~An respectively and the colour temperature value of the whole screen is B, the weighted average of the colour temperature values of the sub-region S1 and the whole screen is C1=XA1+YB, where X and Y are weighting coefficients; and the weighted average C1 is taken as a reference for adjusting the white balance of the whole screen. Similarly, the weighted averages of the colour temperature values of the sub-regions S2~Sn and the colour temperature value of the whole screen are calculated respectively to finally obtain totally n weighted averages C1~Cn. Finally, n photos with different colour effects or white balance effects are shot after white balance adjustment is performed on the screen according to the n colour temperature values respectively.

In the above shooting process, the shooting module 110 may also perform shooting after the white balance is adjusted on the basis of each sub-region. That is, white balance adjustment is performed by taking the sub-region S1 as a colour temperature reference region at first, and photo P1 is accordingly shot; then white balance adjustment is performed by taking the sub-region S2 as a colour temperature reference region, and Photo P2 is accordingly shot; and similarly, totally n photos P1~Pn are finally obtained.

The display module 120 is configured to display the screen and the photo on a screen and display a selection pattern on the shot photo. A size and shape of the selection pattern are not limited, the selection pattern may be rectangular, round, triangular or the like, and the size and shape of the selection pattern are preferably the same as the sizes and shapes of the sub-regions. A position, shape and size of the selection pattern may be adjusted, and the user may adjust the position of the selection pattern by dragging the selection pattern on the screen, and may also directly click the screen to implement automatic movement of the selection pattern to a position where the user clicks.

The processing module 130 is configured to move the position of the selection pattern according to a user instruction, determine a colour temperature reference region according to the position of the selection pattern and control the display module 120 to display a photo shot after white balance adjustment is performed according to the colour temperature reference region. Specifically, after the photos are shot, the processing module 130 determines the sub-region corresponding to the position of the selection pattern, takes the sub-region as the colour temperature reference region, picks the photo shot after white balance adjustment is performed by taking the sub-region as the colour temperature reference region out of the shot photos, and controls the display module 130 to display the photo for the user to preview. If the user is satisfied after previewing, the processing module 130 stores the photo according to a storage instruction issued by the user. After the photo is stored, the user may continue moving the selection pattern on the screen to obtain other photos with different white balance effects or colour effects.

In some embodiments, there may also be multiple selection patterns, positions, shapes and sizes of respective selection patterns correspond to the sub-regions one to one, and the selection patterns annularly surround each sub-region. When the user clicks a certain selection pattern, the processing module 130 takes the sub-region corresponding to the position of the selection pattern as the colour temperature reference region selected by the user, and then picks out and displays a photo shot after white balance adjustment is performed by taking the sub-region as the colour temperature reference region.

In some embodiments, the selection pattern may also not be displayed on the photo, the user may directly touch or click the photo to issue an operating instruction. After receiving the operating instruction, based on the position where the user touches or clicks the photo, the shooting device determines the sub-region corresponding to the position, and then takes the sub-region as colour temperature reference region. Clicking includes soaring clicking.

In some embodiments, the shooting device may also receive a photomontage taken according to the above shooting method from external equipment, then display a selection pattern on the photomontage, or receive an operating instruction for the photomontage from the user, accordingly determine a colour temperature reference region and finally pick out a photo shot after white balance adjustment is performed according to the colour temperature reference region from photomontages and display the photo.

According to the shooting device of the disclosure, when the photos are shot, a plurality of photos with various colour effects or white balance effects are automatically shot after white balance adjustments are independently performed by taking multiple regions of the screen as colour temperature reference regions respectively, and after the photos are shot, the user selects a colour temperature reference region, and based on the colour temperature reference region selected by the user, the photos shot after white balance adjustment is performed according to the colour temperature reference region is picked out for the user to preview and select, so that the user may obtain multiple photos meeting his/her own requirement and with better colour effects by a single shooting.

The shooting device capable of shooting the photos and then adjusting the white balance in the disclosure is particularly applied to a special shooting scene where there is no sufficient time for the user to adjust the white balance or a picture is required to be captured fast, such as a condition of shooting an object which moves fast. Although the white balance is adjusted after the photos are shot in the disclosure, multiple photos of which white balance is independently adjusted have actually been obtained when the photos are shot, so that an original white balance effect of a shooting environment may be accurately recovered after a colour temperature reference region is selected, and the advantages of both white balance pre-adjustment and post-adjustment are achieved. Therefore, shooting requirements of the user in different application scenes are met, the effect of independent white balance post-adjustment may also be achieved, multiple photos with independent white balance effects may be obtained by a single shooting, and a user experience is greatly improved.

It should be understood that the above is only the preferred embodiment of the disclosure and not thus intended to limit the scope of patent of the disclosure, and any equivalent structure or equivalent flow transformations made by virtue of contents of the Specification and drawings of the disclosure, or direct or indirect application of the contents to other related art shall fall within the scope of protection of the disclosure.

INDUSTRIAL APPLICABILITY

The shooting method and shooting device capable of shooting the photos and then adjusting the white balance in the disclosure are particularly applied to a special shooting scene where there is no sufficient time for the user to adjust the white balance or a picture is required to be captured fast, such as a condition of shooting an object which moves fast. Although the white balance is adjusted after the photos are shot in the disclosure, multiple photos of which white balance is independently adjusted have actually been obtained when the photos are shot, so that an original white balance effect of the shooting environment may be accurately recovered after the colour temperature reference regions are selected, and the advantages of both white balance pre-adjustment and post-adjustment are achieved. Therefore, the shooting requirements of the user in different application scenes are met, the effect of independent white balance post-adjustment may also be achieved, multiple photos with independent white balance effects may be obtained by a single shooting, and the user experience is greatly improved.

What is claimed is:

1. A shooting method, comprising steps of:
defining at least two sub-regions on a screen;
shooting photos after performing white balance adjustment by taking the at least two sub-regions as colour temperature reference regions;
determining a selected colour temperature reference region on one of the shot photos; and
picking a photo shot after performing the white balance adjustment according to the selected colour temperature reference region out of the shot photos, and displaying the photo;
wherein the step of shooting the photos after performing the white balance adjustment by taking the at least two sub-regions as the colour temperature reference regions comprises:
obtaining colour temperature values of the at least two sub-regions by taking each sub-region as a colour temperature reference region, and obtaining a colour temperature value of the whole screen by taking the whole screen as a colour temperature reference region;
calculating a weighted average of the colour temperature value of each sub-region and the colour temperature value of the whole screen to obtain at least two weighted averages; and
shooting at least two photos performing the white balance adjustment on the screen according to the at least two weighted averages respectively.

2. The shooting method according to claim 1, wherein the step of determining a selected colour temperature reference region on one of the shot photos comprises:
displaying a selection pattern on one of the shot photos; and
moving the selection pattern according to operation, and determining the sub-region corresponding to a position of the selection pattern as the selected colour temperature reference region.

3. The shooting method according to claim 1, wherein the step of determining a selected colour temperature reference region on one of the shot photos comprises:

determining a position where one of the shot photos is touched or clicked; and
determining the sub-region corresponding to the position as the colour temperature reference region.

4. A shooting method, comprising steps of:
displaying a selection pattern on a photo;
determining a colour temperature reference region according to a position of the selection pattern; and
picking a photo shot after performing white balance adjustment according to the colour temperature reference region out of the shot photos, and displaying the photo;
wherein the method further comprises: before the step of displaying the selection pattern on the photo, defining at least two sub-regions on a screen; and
shooting at least two photos after performing the white balance adjustment by taking each of the at least two sub-regions as a colour temperature reference region;
wherein the step of shooting the at least two photos after performing the white balance adjustment by taking each of the at least two sub-regions as the colour temperature reference region comprises:
obtaining colour temperature values of the at least two sub-regions by taking each of the at least two sub-regions as a colour temperature reference region, and obtaining a colour temperature value of the whole screen by taking the whole screen as a colour temperature reference region;
calculating a weighted average of the colour temperature value of each sub-region and the colour temperature value of the whole screen to finally obtain at least two weighted averages; and
shooting the at least two photos after performing the white balance adjustment on the screen according to the at least two weighted averages respectively.

5. The shooting method according to claim 4, wherein the step of determining the colour temperature reference region according to the position of the selection pattern comprises:
determining a sub-region corresponding to the position of the selection pattern; and
taking the sub-region as the colour temperature reference region.

6. A shooting device, comprising: a shooting module configured to shoot photos for a screen;
a display module configured to display the screen and photos, and display a selection pattern on the photos; and
a processing module configured to move position of the selection pattern, determine a colour temperature reference region according to the position of the selection pattern, pick a photo shot after performing white balance adjustment according to the colour temperature reference region out of the shot photos and control the display module to display the photo;
wherein the shooting module is configured to: define at least two sub-regions on the screen, and shoot at least two photos after performing the white balance adjustment by taking each of the at least two sub-regions as the colour temperature reference region;
wherein the shooting module is configured to: calculate the colour temperature value of each sub-region to finally obtain the colour temperature values of the at least two sub-regions; obtain a colour temperature value of the whole screen by taking the whole screen as a colour temperature reference region; calculate a weighted average of the colour temperature value of each sub-region and the colour temperature value of the whole screen to finally obtain at least two weighted averages; and perform the white balance adjustment on the screen according to the at least two weighted averages respectively.

7. The shooting device according to claim 6, wherein the processing module is configured to: determine a sub-region corresponding to the position of the selection pattern and take the sub-region as the colour temperature reference region.

8. A shooting method, comprising steps of:
receiving an operating instruction for a photo;
determining a colour temperature reference region according to the operating instruction; and
picking a photo shot after performing white balance adjustment according to the colour temperature reference region out of the shot photos, and displaying the photo;
wherein the method further comprises: before the step of receiving the operating instruction for the photo, defining at least two sub-regions on a screen; and
shooting at least two photos after performing white balance adjustment by taking each of the at least two sub-regions as the colour temperature reference region;
wherein the step of shooting the at least two photos after performing the white balance adjustment by taking each of the at least two sub-regions as the colour temperature reference region comprises:
obtaining colour temperature values of the at least two sub-regions by taking each of the at least two sub-regions as a colour temperature reference region, and obtaining a colour temperature value of the whole screen by taking the whole screen as a colour temperature reference region;
calculating a weighted average of the colour temperature value of each sub-region and the colour temperature value of the whole screen to finally obtain at least two weighted averages; and
shooting the at least two photos after performing the white balance adjustment on the screen according to the at least two weighted averages respectively.

9. The shooting method according to claim 8, wherein the operating instruction comprises touch or clicking operation performed on the photo, and the step of determining the colour temperature reference region according to the operating instruction comprises:
determining a sub-region corresponding to a position where the photo is touched or clicked; and
taking the sub-region as the colour temperature reference region.

* * * * *